United States Patent [19]

Bilodeau

[11] Patent Number: 6,057,033
[45] Date of Patent: May 2, 2000

[54] RADIATION-CURABLE RELEASE COMPOSITIONS CONTAINING CELLULOSE FIBERS

[75] Inventor: Wayne Louis Bilodeau, Mentor, Ohio

[73] Assignee: Avery Dennison Corporation, Pasadena, Calif.

[21] Appl. No.: 08/990,183

[22] Filed: Dec. 12, 1997

[51] Int. Cl.[7] .................................................. D02G 3/00
[52] U.S. Cl. .......................... 428/372; 428/405; 428/326; 428/402; 522/88; 522/99; 427/493; 427/508; 427/515; 528/25
[58] Field of Search .............................. 428/411.1, 326, 428/447, 452, 359, 364, 372, 374, 402, 405; 117/93; 222/1, 260, 261, 262; 156/279; 427/493, 508, 515; 522/88, 99; 528/25

[56] References Cited

U.S. PATENT DOCUMENTS

| | | | |
|---|---|---|---|
| 2,458,166 | 1/1949 | Homeyer, Jr. | 117/68.5 |
| 2,971,863 | 2/1961 | Kindseth et al. | 117/68.5 |
| 3,503,782 | 3/1970 | Ayres | 117/45 |
| 3,933,702 | 1/1976 | Caimi et al. | 260/17 |
| 4,041,200 | 8/1977 | Boranian et al. | 428/40 |
| 4,138,527 | 2/1979 | Malek | 428/425 |
| 4,201,808 | 5/1980 | Cully et al. | 428/40 |
| 4,279,717 | 7/1981 | Eckberg et al. | 204/159.13 |
| 4,313,988 | 2/1982 | Koshar et al. | 428/40 |
| 4,421,904 | 12/1983 | Eckberg et al. | 528/27 |
| 4,513,059 | 4/1985 | Dabroski | 428/355 |
| 4,547,431 | 10/1985 | Eckberg | 428/413 |
| 4,643,924 | 2/1987 | Uken et al. | 428/35 |
| 4,751,141 | 6/1988 | Fink et al. | 428/326 |
| 4,822,687 | 4/1989 | Kessel et al. | 428/447 |
| 4,867,828 | 9/1989 | McIntyre | 156/247 |
| 4,952,657 | 8/1990 | Riding et al. | 528/27 |
| 5,061,524 | 10/1991 | Hinterwaldner | 427/385.5 |
| 5,072,854 | 12/1991 | Niemi et al. | 222/1 |
| 5,104,477 | 4/1992 | Williams et al. | 156/401 |
| 5,112,425 | 5/1992 | Besso | 156/247 |
| 5,202,190 | 4/1993 | Kantner et al. | 428/447 |
| 5,210,121 | 5/1993 | Hinterwaldner | 524/109 |
| 5,217,805 | 6/1993 | Kessel et al. | 428/352 |
| 5,260,348 | 11/1993 | Shepherd et al. | 522/25 |
| 5,279,860 | 1/1994 | Griswold et al. | 427/386 |
| 5,284,690 | 2/1994 | Williams et al. | 428/40 |
| 5,318,815 | 6/1994 | Newing et al. | 428/40 |
| 5,332,797 | 7/1994 | Kessel et al. | 528/27 |
| 5,360,833 | 11/1994 | Eckberg et al. | 522/31 |
| 5,409,773 | 4/1995 | Kessel et al. | 428/352 |
| 5,569,503 | 10/1996 | Piotroski | 428/41.8 |
| 5,612,107 | 3/1997 | Sangani et al. | 428/41.7 |

OTHER PUBLICATIONS

Katz et al Handbook of Fillers and Reinforcement for Plastics.: Van Nostrand Reihold Co. pp. 292–294.

Search Report for Application No. PCT/US98/25602; Mailed on Mar. 18, 1999.

General Electric Co., Product Literature Entitled "GE Silicons—SL 5000 Solventless Release Coating System", 1991.

General Electric Co., Material Safety Data Sheet for "SL 5030", Apr. 25, 1994.

J. Retlenmaier & Sohne Gmbh, Product Literature for "Arbocel Grade BE 600–100".

Interfibe Corporation, Product Literature for "Interfibe."

*Primary Examiner*—William Krynski
*Assistant Examiner*—Hong J. Xu
*Attorney, Agent, or Firm*—Renner, Otto, Boisselle & Sklar

[57] ABSTRACT

This invention relates release compositions that comprise a radiation curable polyorganosiloxane and cellulose fibers having an average fiber length of about 15 to about 100 microns and an average fiber thickness in the range of about 5 to about 40 microns. This invention also relates to a method of making a release coated substrate comprising coating a substrate with the foregoing release coating composition and curing the coating by exposing it to radiation. This invention relates to release coated articles made by the foregoing method. The invention also relates to multilayered articles comprising a first substrate, a second substrate, the foregoing release composition which has been cured by exposure to radiation, and a pressure sensitive adhesive, the release composition being adhered to the first substrate, the pressure sensitive adhesive being adhered to the second substrate, and the release composition and the pressure sensitive adhesive being adhered to each other.

22 Claims, 1 Drawing Sheet

RADIATION-CURABLE RELEASE COMPOSITIONS CONTAINING CELLULOSE FIBERS

TECHNICAL FIELD

This invention relates to release compositions and, more particularly, to radiation curable release coating compositions containing cellulose fibers.

BACKGROUND OF THE INVENTION

Release coating compositions are used, for example, to coat papers or films which are used as release backing sheets (sometimes referred to as protective release sheets or release liners), overlying the pressure sensitive adhesive used in pressure-sensitive products such as labels, decals, tapes, etc. The pressure sensitive adhesive adheres to the release coated surface of the release backing sheet sufficiently to enable the pressure sensitive products to be handled prior to use. When such products are used, the release backing sheet is pulled off and discarded. The exposed pressure-sensitive adhesive is pressed onto a surface where the pressure sensitive product is to be placed. Known types of release backing sheets include paper release backing sheets wherein one side of the paper (the release side) is coated with a silicone polymer or copolymer.

Silicone polymers and copolymers have been used extensively in providing release coatings on paper, film, etc., because they are inherently low in surface energy. It is desirable that release-coated papers and films have a release force which is low enough to enable the release backing sheet to be easily removed from a pressure sensitive adhesive coated substrate, but not so low that the release backing sheet will become separated from the pressure sensitive adhesive prior to when desired by forces normally encountered in handling and processing such as printing, die cutting and matrix stripping. "Release force" is defined as the amount of force required to peel or separate the release-coated substrate from the adhesive.

The silicone polymers and copolymers (sometimes referred to as polyorganosiloxanes) used in the prior art for making release coating compositions can be radiation cured or thermally cured. The radiation cured polymers have a number of advantages over the thermally cured polymers including better adhesion to certain substrates, higher cure processing speeds, and lower high speed release. However, the radiation cured polymers are often more brittle than the thermally cured polymers and thus problems often occur during handling and processing, especially during die cutting. It would be advantageous to provide a release coating composition that utilized such radiation cured polymers and yet did not exhibit the brittleness problems typically incurred with such polymers.

Polyorganosiloxanes containing functional groups which can be radiation cured in the presence or absence of a photosensitizer have been described in various patents as useful silicone release compositions. U.S. Pat. No. 3,726,710 describes radiation-curable release compositions comprising an polyorganosiloxane having olefinically unsaturated organic groups and a photosensitizer. The composition may be applied to a paper substrate and cured by exposure to high intensity radiation to produce a release coating.

The use of polyorganosiloxanes with acrylate or methacrylate ester groups linked to SiC groups as radiation-curable coating materials is described in, for example, U.S. Pat. Nos. 3,878,263; 4,064,286; 4,963,438; 4,908,274; 4,978,726; and 5,034,491.

The use of epoxypolyorganosiloxanes in making release coating compositions is described in U.S. Pat. Nos. 4,279,717; 4,313,988; 4,421,904; 4,547,431; 4,822,687; 5,217,805; 5,279,860; 5,332,797; and 5,360,833.

It is well known to use cellulose fibers as fillers in plastics. This use is disclosed, for example, in Katz et al., "Handbook of Fillers and Reinforcements for Plastics", Van Nostrand Reinhold Co., 1978, pages 292–294.

U.S. Pat. Nos. 3,503,782 discloses a differential release paper having a initial coating of a first release agent and a coating of a second release agent applied over a portion of the initial coat, each of the release agents having different release characteristics. The reference indicates that filler material in finely divided form can be added to the release agent coatings to control rheological properties and release characteristics. The filler materials are identified as calcium carbonate, titanium dioxide, silica, alumina, mica, calcium silicate, zinc oxide, iron oxide, polyvinylchloride, polyesters, polyamides and polycarbonates.

SUMMARY OF THE INVENTION

This invention relates to a release coating composition that is comprised of a radiation curable polyorganosiloxane and cellulose fibers having an average fiber length of about 15 to about 100 microns and an average fiber thickness in the range of about 5 to about 40 microns. This invention also relates to a method of making a release coated substrate comprising coating a substrate with the foregoing release coating composition and curing the coating by exposing it to radiation. This invention relates to release coated articles made by the foregoing method. The invention also relates to multilayered articles comprising a first substrate, a second substrate, the foregoing release coating composition which has been cured by exposure to radiation, and a pressure sensitive adhesive, the release coating composition being adhered to the first substrate, the pressure sensitive adhesive being adhered to the second substrate, and the release coating composition and the pressure sensitive adhesive being adhered to each other.

DESCRIPTION OF THE PREFERRED EMBODIMENTS

Figure 1:
FIG. 1 is a photomicrograph taken at a magnification of 1000× of a die cut sample of the multi-layered construction prepared in Example 1 using Sample A. The multi-layered construction and Sample A are representative of the invention.

The radiation-curable polyorganosiloxanes that can be used with this invention can be any radiation-curable polyorganosiloxane known in the art. These compounds include radiation-curable epoxypolyorganosiloxanes. These compounds are sometimes referred to as radiation-curable polysiloxanes or silicones, and include, in particular, radiation-curable polydimethylsiloxanes.

The polyorganosiloxanes may contain acryloxy groups, methacryloxy groups, or combinations thereof. A variety of such acryloxy or methacryloxy containing polyorganosiloxanes can be used with the inventive release coating compositions. In one embodiment, the polyorganosiloxane compounds containing acryloxy and/or methacryloxy groups which can be utilized in the present invention may be represented by the formula $$[R_nSiO_{4-n/2}]_m \quad (I)$$

wherein in Formula (I), each R is acryloxy, methacryloxy, a non-substituted monovalent hydrocarbon group containing from 1 to about 20 carbon atoms or a substituted monovalent hydrocarbon group wherein the substituents are selected from the group consisting of chloro-, fluoro-, cyano-, amido-, nitro-, ureido-, isocyanato-, carbalkoxy-, hydroxy-, acryloxy-, methacryloxy-, etc.; n has an average value of about 1.8 to about 2.2; and m has an average value greater than 2, and in one embodiment greater than about 25, and in one embodiment from about 100 to about 500; the polyorganosiloxane containing an average of at least one R group which contains an acryloxy or methacryloxy group, namely, $$CH_2=C(X)C(O)\!-\!O\!- \quad (II)$$

wherein in Formula (II), X is hydrogen or methyl. The substituents represented by R in Formula (I) include, for example, monovalent aliphatic groups such as methyl, ethyl, propyl, hexyl, etc.; monovalent cycloaliphatic groups such as cyclohexyl, cyclopentyl, etc.; aryl groups such as phenyl, methylphenyl, benzyl, etc.; alkenyl groups such as vinyl, allyl, 3-butenyl, etc. Examples of R groups which are substituted hydrocarbon groups include pentachlorophenyl, aminomethyl, 3-aminopropyl, etc.

Each acryloxy or methacryloxy group is attached to the siloxane backbone through a carbon-to-silicon bond or a carbon-oxygen-silicon bond. More often, there are present an average of from about 2 to about 25, and in one embodiment from about 2 to about 10 of the R groups containing an acryloxy or methacryloxy group. Alternatively, the polyorganosiloxane compounds containing acryloxy and/or methacryloxy groups useful in the present invention may be defined as containing from about 3% to about 75% by weight of acryloxy or methacryloxy groups, and in one embodiment about 3% to about 50% by weight of the acryloxy or methacryloxy groups. The polyorganosiloxanes that are useful with this invention have an average molecular weight of from about 1000 to about 20,000, and in one embodiment about 3500 to about 8000. Polyorganosiloxanes of higher molecular weight also may be used.

Typically, the R groups in Formula (I) have the structure $$CH_2=C(X)C(O)\!-\!O\!-\!R'\!- \quad (III)$$

wherein in Formula (III), R' is a divalent hydrocarbon group of from 1 to about 15 carbon atoms or an oxyalkylene group containing from 1 to about 4 carbon atoms in the alkylene moiety.

The polyorganosiloxanes containing the acryloxy or methacryloxy groups of Formula (III) can be prepared, for example, by reacting siloxane containing hydroxyl groups or epoxy groups with acrylic acid or methacrylic acid. The siloxanes containing hydroxyl groups may be prepared by reacting a reactive siloxane (e.g., containing halogen) with a polyhydroxy compound such as ethylene glycol, propylene glycol, glycerol or pentaerythritol.

The polyorganosiloxanes described above may be linear or branched and in one embodiment they are substantially linear. As will be recognized by those skilled in the art, the polyorganosiloxanes of Formula (III) will also have an appropriate number of end-capping units, $R_3SiO\!-\!$, at the terminals of the molecule where R is as previously defined.

The polyorganosiloxanes containing acryloxy and/or methacryloxy groups as described above are generally fluids which have viscosities in the range of from about 25 cps to 10,000 cps. Polyorganosiloxanes of the type described above are known in the art, and various methods for producing such polyorganosiloxanes are described in U.S. Pat. Nos. 3,878,263; 4,064,286; 4,301,268; 4,306,050; 4,908,274; 4,963,438; 4,978,726; and 5,034,491, which are hereby incorporated by reference for their disclosure of acrylate or methacrylate containing polyorganosiloxanes and methods of preparing polyorganosiloxanes containing acryloxy and/or methacryloxy groups that are useful in the compositions of the present invention.

Polyorganosiloxanes containing acryloxy and/or methacryloxy groups are available commercially from, for example, Goldschmidt Chemical Corp., Hopewell, Va. Goldschmidt's silicone acrylate series include dimethylpolysiloxanes available under the general trade designation Tergo® RC, and more particularly, under designations such as RC 450, RC 450N, RC 706, RC 707, RC 710, RC 720 and RC 726. Some of these polyorganosiloxanes are of the type prepared by the reaction of acrylic acid or methacrylic acid with dimethylpolysiloxane containing hydroxyl groups or epoxy groups. A useful polyorganosiloxane containing epoxy groups is available from General Electric under the designation UV 9315.

In one embodiment, the radiation-curable silicone release composition which can be used comprises an polyorganosiloxane containing acryloxy or methacryloxy groups, and further comprises an acrylated or methacrylated organic polyhydroxy compounds or polyamino compounds. The weight ratio of polyorganosiloxane to acrylated and methacrylated polyhydroxy and polyamino compounds may vary over a wide range. Thus, the mixture may comprise from about 2% to about 90% by weight of the polyorganosiloxane and from about 10% to about 98% by weight of the acrylated or methacrylated polyhydroxy and/or polyamino compounds. In one embodiment, this mixture contains about 2% to about 7% of the polyorganosiloxane and from about 93% to 98% by weight of the acrylated or methacrylated polyhydroxy and/or polyamino compounds.

The inventive release compositions may comprise a mixture of more than one acrylated or methacrylated organic polyhydroxy compound or polyamino compound. Such mixtures may comprise two or more derivatives derived from polyhydroxy compounds, two or more compounds derived from polyamino compounds, mixtures of one or more compounds derived from a polyhydroxy compound and one or more compounds derived from a polyamino compound. Thus, in one embodiment, the mixture comprises a mixture of from about 40% to about 70% by weight of at least one acrylated or methacrylated polyamine oligomer, and from about 30% to about 60% by weight of at least one acrylated or methacrylated polyhydroxy compound.

In one embodiment, a portion of the acrylated or methacrylated compound may be replaced by a liquid monoacrylate ester. For example, from about 1% to about 20% by weight of the polyacrylate in the above mixtures may be replaced by a liquid monoacrylate ester to modify the properties of the radiation-curable silicone release composition and, in some instances, the properties of the radiation-cured release composition. The liquid monoacrylate esters generally are characterized by a low viscosity such as from about 1 to about 50 cps at 25° C., and these monoacrylate compounds are useful to improve the fluidity of the curable release compositions of the invention. Examples of such liquid monoacrylate esters include ethyl acrylate, butyl acrylate, 2-ethylhexyl acrylate, allyl acrylate, n-amyl acrylate, benzyl acrylate, cyclohexyl acrylate, diethylaminoethyl acrylate, 2-ethoxyethyl acrylate, n-lauryl acrylate, n-octyl acrylate, octadecyl acrylate, etc., the corresponding methacrylates and mixtures thereof.

The monoacrylate and monomethacrylate compounds do not form a network when polymerized by radiation. However, the monoacrylates do modify the network formed by the polyfunctional acrylates. These monoacrylate compounds normally copolymerize with the polyfunctional acrylates and methacrylates.

In one embodiment, the polyorganosiloxane is a curable epoxypolyorganosiloxane. These compounds can be represented by the formula:

$$GO(R_2SiO)_a (RESiO)_b G \qquad (IV)$$

wherein in Formula IV: each R is independently a hydrocarbon group of 1 to about 18 carbon atoms, and in one embodiment 1 to about 6 carbon atoms; E is a monovalent epoxy containing hydrocarbon group; G is a silyl group represented by the formula $R_3Si-$ or $R_2ESi-$ wherein R is as defined above; a is a number in the range of about 10 to about 300, and in one embodiment about 50 to about 200; and b is a number in the range of about 2 to about 10.

Illustrative examples of the hydrocarbon group R in Formula (IV) include alkyl groups such as methyl, ethyl, propyl, isopropyl, butyl, isobutyl, tert-butyl, hexyl, octyl and octadecyl; aryl groups such as phenyl, naphthyl and bisphenylyl; alkaryl groups such as tolyl and xylyl; aralkyl groups such as phenylmethyl, phenylpropyl and phenylhexyl; and cycloaliphatic groups such as cyclopentyl, cyclohexyl and 3-cyclohexylpropyl; and ether oxygen- or ester oxygen-containing groups such as ethoxypropyl, butoxybutyl, and ethoxycarbonylpropyl and the like. The siloxane groups,

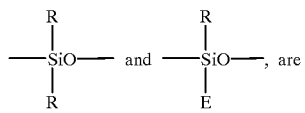

ordered or randomly arranged in the epoxypolyorganosiloxane and the epoxy-containing hydrocarbon group, E, contains at least one epoxy group,

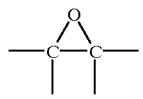

the remainder being comprised of carbon and hydrogen and, in addition to the oxirane oxygen, this group may optionally contain ether, —O—, or carbonyl oxygen, e.g.,

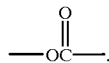

Illustrative examples of E include:

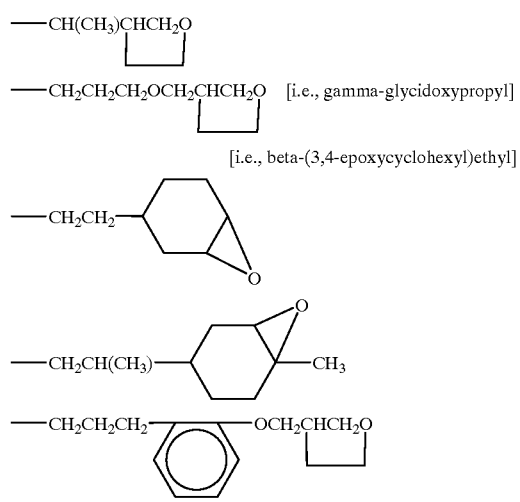

In the above epoxy-containing hydrocarbon group, the epoxy group is preferably located at the terminal position but it need not be a terminal group.

In one embodiment, the epoxypolyorganosiloxanes are those where R is methyl, and E is beta-(3,4-epoxycyclohexyl)ethyl or gamma-glycidoxypropyl.

The epoxypolyorganosiloxanes can be prepared by many methods known in the art such as the chloroplatinic acid catalyzed addition reaction of hydrosiloxanes, containing the ≡SiH reactive group, with aliphatically unsaturated epoxy compounds, epoxidation of vinyl or like unsaturated siloxanes and Grignard type reactions as for example described by E. P. Plueddemann and G. Fanger, J. Am. Chem. Soc. 81, 2632–35 (1959), and U.S. Pat. Nos. 4,279,717; 5,258,480; 5,360,833; 5,391,676; and 5,397,813 which are incorporated herein by reference.

An example of a useful epoxypolyorganosiloxane that is commercially available is UV 9400 which is available from GE Silicones.

In one embodiment, the inventive release coating composition further comprises an organosiloxane copolymer represented by the formula $$(R_3SiO)_x(SiO_{4/2})_y \qquad (V)$$

wherein in Formula (V), each R is independently a hydrocarbon group or a group represented by the formula

—O(O)C—(R*)=CH_2 wherein R* is hydrogen or a methyl or ethyl group; x is a number from about 0.25 to about 75, and in one embodiment from about 1 to about 75, and in one embodiment about 3 to about 26; y is a number from about 1 to about 56, and in one embodiment from about 10 to about 20; and the ratio of x to y is from about 0.3:1 to about 1.5, and in one embodiment about 0.3:1 to about 1.3:1, and in one embodiment 0.7:1 to about 1.5:1, and in one embodiment about 0.8:1, and in one embodiment about 0.65:1. These compounds can have number average molecular weights of up to about 10,000. Each R in Formula (V) can be the same or different and can contain up to about 10 carbon atoms, and in one embodiment about 2 to about 6 carbon atoms. Each R can be independently an alkyl group such as methyl, ethyl, isopropyl, butyl or hexyl; an alkenyl group such as vinyl, allyl or hexenyl; an aryl group such as phenyl, tolyl or xylyl; an aralkyl group such as beta-phenylethyl or beta-phenylpropyl; a cycloaliphatic group such as cyclopentyl, cyclohexyl or cyclohexenyl; or an acrylic group such as acrylate or methacrylate. The inventive release compositions may contain a copolymer of the type represented by Formula (V) at a concentration of up to about 90% by weight based on the total weight of inventive release compositions.

Copolymers of the type represented by Formula (V) are sometimes referred to in the art as MQ resins due to the fact that the group $R_3SiO$ is a monofunctional group and the group $SiO_{4/2}$ is a quadrafunctional group. Copolymers of this type are well known in the art and described, for example, in U.S. Pat. No. 2,676,182, which is incorporated herein by reference for its teachings regarding the preparation of such copolymers. Briefly summarized, these copolymers can be prepared by acidifying an aqueous solution of sodium silicate using a mixture of hydrochloric acid and isopropanol. The resulting acidic silica hydrosol is then treated with a source of $R_3SiO_{1/2}$ siloxane units, such as $R_3SiOCH_3$, $R_3SiCl$ or $R_3SiOSiR_3$, dissolved in a mixture of isopropanol and xylene. The molar ratio of $R_3SiO_{1/2}$ units to the $SiO_{4/2}$ units derived from the sodium silicate is generally from about 0.3:1 to about 1.5:1, and in one embodiment about 0.3:1 to about 1.3:1. After being heated, the reaction mixture is cooled, separated into an aqueous phase, which is discarded, and a nonaqueous phase comprising the siloxane copolymer. The siloxane copolymer is further washed with water to reduce its acid number and to remove water-soluble components, such as isopropyl alcohol. In one embodiment, siloxane copolymer has sufficient acid remaining therein to provide an acid number of from about 0.2 to about 2.

An example of a commercially available copolymer of the type represented by Formula (V) in which the R group is vinyl is available from GE Silicones under the trade designation SL 5030. Another example of a copolymer of this type that is available is UV 9430 which is available from GE Silicones. Another example is the organosiloxane copolymer present in RC-708, which is a product of Goldschmidt Chemical that is believed to be a mixture of a dimethylpolysiloxane and an organosiloxane copolymer of the type represented by Formula (V). Other commercially available copolymers that are useful include: SL4406, SL5070 and SL6030 available from GE Silicones; Syl-Off 7602, 7679, Q2-7069 and 7810 available from Dow Corning; PC-290 available from Rhone-Poulenc; and VP1517, CRA-17 and CRA-64 available from Wacker. Solvent-borne versions of these copolymers are available from PCR Inc. under the designations MQV-4, MQOH4, MQOH-6 and MQDH-1.

The inventive release compositions may contain at least one photoinitiator. The amount of photoinitiator included in the release compositions may range from about 0% to about 10% by weight, and in one embodiment from about 0.5% to about 5% by weight, based on the total weight of the release composition (excluding the weight of the surface treated particulate solids). A photoinitiator is incorporated into the curable release compositions when compositions are to be cured by exposure to non-ionizing radiation such as ultraviolet light. Photoinitiators are not required when the curable silicone is cured by electron beam radiation. Examples of photoinitiators which may be used in combination with ultraviolet light includes, for example, benzyl ketals, benzoin ethers, acetophenone derivatives, ketoxime ethers, benzophenone, benzo or thioxanthones, etc. Specific examples of photoinitiators include: 2,2'-diethoxyacetophenone; 2- or 3- or 4-bromoacetophenone; benzoin; benzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; and mixtures thereof. Examples of commercially available photoinitiators that can be used are available from the Ciba Geigy Corporation of Hawthorne, N.Y. under the tradename of Durocure 1173, and General Electric Company under the name UV9380C.

The cellulose fibers are derived from plant fibers, and in one embodiment they are derived from cotton or wood. The plant fibers are subjected to known mechanical and chemical treatment techniques to break up cell or fiber bundles and remove liquid and other compounds which may be present. In one embodiment, the cellulose fibers are obtained by laterally separating the cell bundles, this technique providing cellulose fibers with increased surface areas. The celluose fibers have an average fiber length of about 15 to about 100 microns, and in one embodiment about 18 to about 23 microns, and in one embodiment about 18 microns. The average fiber thickness is in the range of about 5 to about 40 microns, and in one embodiment about 15 to about 17 microns, and in one embodiment about 15 microns. The celloluse fibers typically have a specific gravity in the range of about 1.0 to about 1.25, and in one embodiment about 1.1. The average bulk density for the cellulose fibers is in the range of about 210 to about 300 grams per liter, and in one embodiment about 210 to about 270 grams per liter. The pH for the cellulose fibers is typically in the range of about 5 to about 7. The cellulose fibers have a cellulose content of at least about 99% by weight, and in one embodiment at least about 99.5% by weight. Examples of commercially available cellulose fibers that can be used include those available from J. Rettenmaier & Sohne GmbH under the trade designation Arbocel, Grade BE 600-10, which is identified as cellulose micro fibers derived from beech having a cellulose content of 99.5% by weight, an average fiber length of 18 microns, an average fiber thickness of 15 microns, a bulk density of 210 to 300 grams per liter, and a pH of 5–7. Also useful is Interfibe, a product of Interfibe Corporation identified as cellulose fibers obtained through the lateral separation of cell bundles found in cellulose and having specific a gravity of about 1.1.

The cellulose fibers can be combined with the polyorganosiloxanes of the inventive compositions using standard mixing techniques. These materials can be mixed at a temperature in the range of about 15° C. to about 40° C., and in embodiment about 20° C. to about 30° C. The cellulose fibers are used in the inventive release coating compositions at a concentration sufficient to enhance the strength of the cured coatings provided by such compositions and typically in the range of about 3 to about 25 percent by weight, and in one embodiment about 5 to about 10 percent by weight, based on the total weight of the release composition.

The release compositions of the present invention are applied to the desired substrate as a coating by any conventional means known in the coating art such as roller coating, curtain coating, brushing, spraying, reverse roll coating, doctor knife, dipping, die coating, offset gravure techniques, etc. The liquid being applied to the substrate may be heated or cooled to facilitate the coating process and to alter the depth of the penetration of the liquid coated into the substrate prior to curing.

A variety of substrates can be coated with the inventive release compositions, and these compositions can be applied to any substrate when it is desirable to modify the release properties of a surface of the substrate. For example, the compositions of the present invention can be employed to form release coatings on substrates such as paper, vinyl, polyvinyl chloride films, polyester films, polyolefin films, non-woven fabrics, glass, steel, aluminum, etc. Included among the types of paper which can be used is paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkalichlorine processes, nitric acid processes, semi-chemical processes, etc. Although paper of any weight can be employed as a substrate material, paper having weights in the range of from about 20 to about 150 pounds per ream are useful, and papers having weights in the range of from about 30 to about 60 pounds per ream are presently preferred. The term "ream" as used herein equals 3000 square feet. The present invention is particularly useful in providing release characteristics to paper and polymeric films.

The amount of the inventive release composition applied to the various substrates varies depending upon the characteristics of the substrate, the properties desired in the release coating, the radiation source utilized, and the particular formulation of the release composition. If an excess of the release composition is applied to the substrate, the physical characteristics of the substrate may be affected in an undesirable manner. Also, for economic reasons, it is normally desired to apply the lowest amount of coating to obtain the desired result. Thus, applied coating weights may, depending on the substrate and intended use, vary over a wide range but typically range from about 0.1 to about 10 or more grams per square meter (gsm). In general, when it is desired to produce a release-coated paper useful as a protective cover for a pressure-sensitive adhesive tape, the applied coating weights are from about 1 to about 3 gsm. At these levels, desirable high release characteristics are obtained without distorting the essential components of the substrate so that a flat construction which has good performance in the end use can be produced.

The inventive release compositions can be cured by exposure to known forms of ionizing or actinic non-ionizing radiation. Useful types of radiation include ultraviolet light, electron beam, x-ray, gamma-ray, beta-ray, etc. If ultraviolet light is to be used as the form of radiation, a photoinitiator such as described above is included in the curable release composition. One of the advantages of using radiation to effect cure of the composition is that polymerization takes place rapidly at ambient temperature, and heating is not necessary. The equipment for generating these forms of radiation are well known to those skilled in the art.

Curing of the inventive release compositions can be effected in a continuous manner by passing the release-coated substrate through radiation equipment which is designed to provide the coated substrate with sufficient residence time to complete the cure of the coating. Curing may be effected in an air atmosphere or in an inert atmosphere such as nitrogen or argon. The length of exposure necessary to cure the release compositions of the present invention varies with such factors as the particular formulation used, type and wavelength of radiation, dose rate, energy flux, concentration of photoinitiator (when required), the atmosphere and thickness of the coating. A total dosage of from about 0.2 to about 10 megarads, and in one embodiment about 1 to about 2 megarads, is typically sufficient to cure the inventive release compositions. Generally, the time of exposure that is required is about 0.1 to about 3 seconds, and in one embodiment about 0.5 to about 1 second. The actual exposure time required to give proper curing for various release compositions can be readily determined by one skilled in the art with a minimum of experimentation. In one embodiment, the dosage is about 50 to about 200 mj/cm$^2$, and in one embodiment about 70 to about 120 mj/cm$^2$.

Substrates which have been coated with the inventive release compositions and cured exhibit desirable high and controlled release properties. The release coating is resistant to moisture and solvents, and the coating is thermally stable. As indicated previously, a substrate which is coated with the cured release composition of the present invention can be used as a protective covering for a second substrate having pressure-sensitive adhesive coating on its surface. The protective covering is normally applied to the adhesive-coated substrate by bringing the two coated substrates into surface-to-surface contact with the release coating on the first substrate in contact with the pressure-sensitive adhesive on the second substrate. Application of a slight pressure is usually effective to cause the coated substrates to adhere together forming a four-layered laminate. When a coated release paper prepared in accordance with the present invention is used as a protective covering on a pressure-sensitive adhesive tape, a desirable high-release force is required before the release-coated paper will separate from the adhesive tape, and there is little transfer of the silicone release coating from the paper onto the adhesive. The inventive release composition is useful particularly to prepare coated papers which are useful in high-speed equipment such as labeling equipment where a high release force is desired at the high peel rates utilized.

Accordingly, the present invention contemplates the use of the compositions described above in the preparation of multi-layer articles or constructions comprising (a) a first substrate; (b) a second substrate; (c) a release layer comprising the inventive release coating composition which has been cured by exposure to radiation; and (d) a layer comprising a pressure-sensitive adhesive composition, wherein the release layer (c) is interposed between the first substrate and the layer of pressure-sensitive adhesive and is preferentially adherent to the first substrate, and the pressure-sensitive adhesive layer (d) is interposed between the release layer and the second substrate and is preferentially adherent to the second substrate. Additional layers can be interdispersed between the first substrate and the layer of pressure-sensitive adhesive and between the second substrate and the release layer to provide additional desirable properties such as increased strength, increased dimensional stability, etc. As in other applications described above, the first and second substrates may comprise a variety of materials including paper, polyolefins, vinyl, polyester, aluminum, etc., although substrates such as vinyl, polyolefins and paper are preferred.

With reference to the multi-layered articles or constructions utilizing at least one layer of a pressure-sensitive adhesive composition, any pressure-sensitive adhesive composition known in the art can be utilized. Such adhesive compositions are described in, for example, "Adhesion and Bonding", *Encyclopedia of Polymer Science and Engineering,* Vol. 1, pages 476–546, Interscience Publishers, 2nd Ed. 1985. Such compositions generally contain an adhesive polymer such as natural, reclaimed or styrene-butadiene rubber, styrene butadiene or styrene isoprene block copolymers, polyisobutylene, poly(vinyl ether) or poly(acrylic) ester as a major constituent. Other materials may be included in the pressure-sensitive adhesive compositions such as resin tackifiers including, for example: rosin esters, oil-soluble phenolics, or polyterpenes; antioxidants; plasticizers such as mineral oil or liquid polyisobutylenes; and fillers such as zinc oxide or hydrated alumina. The selection of the pressure-sensitive adhesive to be used in any particular multi-layer article or construction is not critical to this invention, and those skilled in the art are familiar with many suitable pressure-sensitive adhesives. However, as known to those skilled in the art, the pressure-sensitive adhesive and the release layer should not chemically react.

The inventive release compositions provide cured coatings and films which have excellent release characteristics, and when applied to a substrate such as paper, the coated paper exhibits improved dimensional stability under varying conditions such as temperature, humidity, aging, etc. A particularly desirable property of substrates such as paper which have been coated with the release compositions of this invention and constructions such as labels prepared therefrom is that they lay flat and remain flat over time, even when exposed to moisture and low or high temperatures.

The cellulose fibers used with the inventive release compositions provide such compositions with enhanced die-cutting resistance and improved silicone transfer during processing. The strength of the cured release coatings is enhanced in relation to both tensile and tearing properties. The cellulose fibers improve anchorage of the release coating compositions on paper and film substrates, reduces dive through on porous substrates, and reduce misting. The cellulose fibers provide for significant cost reductions due to the fact that their use allows for reduced levels of costly polyorganosiloxane polymers.

The inventive release compositions are particularly advantageous when the polyorganosiloxane is a radiation-curable epoxy polyorganosiloxane due to the fact that such compositions can be used with conventional substrates such as conventional release liner paper. When the cellulose fibers are not used, specially designed substrates are required for use with such epoxy polyorganosiloxanes.

While not wishing to be bound by theory, it is believed that the radiation cured release compositions that are currently available tend to be brittle because of the increased functionality of such coatings and from the radiation curing process. Inclusion of the cellulose fibers in accordance with the invention provides a source of OH groups which cure into the network during radiation curing. As a result, the strength of the cured network is enhanced.

EXAMPLE 1

Release coating compositions having the formulations indicated below are prepared (all numerical values in the table below being in parts by weight):

|  | Sample | |
| --- | --- | --- |
| Ingredients | A | B |
| UV 9400 | 90.5 | 95.5 |
| Arbocel BE 600-10 | 5 | 0 |
| UV 9380C | 2 | 2 |
| UV 9330 (product of GE identified as a release additive) | 2.5 | 2.5 |

Sample A is representative of the invention and Sample B is a control sample provided for purposes of comparison. Sample A is made by mixing UV 9400, UV 9380C and UV 9330 at room temperature until a uniform mixture is formed and then adding the Arbocel BE 600-10 and mixing until a uniform mixture is obtained. Sample B is made by mixing the UV 9400, UV 9380C and UV 9330 at room temperature until a uniform mixture is obtained. Release coated liners are made using Samples A and B by drawing the samples down on 44# paper liners that have been coated with a layer of polyolefin. The coat weight is 1.2 gsm and the lamination pressure is 40 psi. The drawn-down samples are cured under the following conditions:

| | |
| --- | --- |
| Line speed: | 150 fpm |
| Radiation type: | 600 watt fusion 50% Power, "H" bulb |
| Dose: | 150 mj/cm$^2$ |

Figure 2:
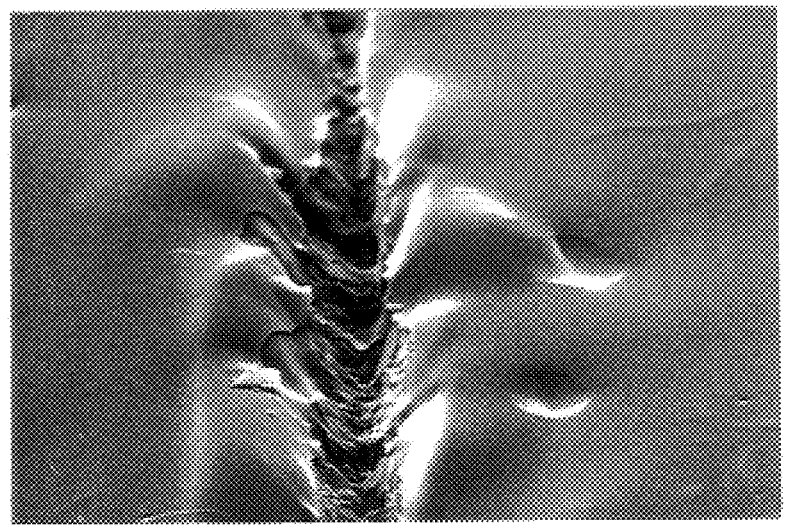
FIG. 2 is a photomicrograph taken at a magnification of 1000× of a die cut sample of the multi-layered construction prepared in Example 1 using Sample B. The multi-layered construction and Sample B are representative of the prior art and are provided herein for purposes of comparison.

Multi-layered constructions are made by adhering the release coated liner samples to the adhesive surface of an adhesive coated facestock. The facestock is a Mirage 200 tape facestock (a product of Mobil). The adhesive is an acrylic emulsion adhesive. The multi-layered constructions are die cut at a speed of 50 fpm and a die cut pressure of 300 psi. Photomicrographs taken at a magnification of 1000× of the die cut samples are disclosed as FIGS. 1 and 2. FIG. 1 is a photomicrograph of the multi-layered construction prepared with Sample A (the invention). FIG. 2 is a photomicrograph of the multi-layered construction prepared with Sample B (the control). A comparison of FIGS. 1 and 2 clearly indicates enhanced die cutting resistance characteristics when using the invention (FIG. 1) as compared to the control (FIG. 2).

EXAMPLE 2

Release coating compositions having the formulations indicated below are prepared (all numerical valves in the table below being in parts by weight):

| | Sample | | | |
| --- | --- | --- | --- | --- |
| Ingredients | A | B | C | D |
| UV 9400 | 90.5 | 85.5 | 80.5 | 95.5 |
| UV 9380C | 2 | 2 | 2 | 2 |
| UV 9330 | 2.5 | 2.5 | 2.5 | 2.5 |
| Arbocel BE 600-10 | 5 | 10 | 15 | 0 |

Samples A–C are representative of the invention, and Sample D is a control provided for purposes of comparison. The samples are drawn on 44# paper liners that have been coated with a layer of polyolefin. The coat weight is 1.3 gsm and the lamination pressure is 40 psi. The drawn-down samples are cured under a fusion mecury lamp, "H" bulb, 600 watts at 50% power, at a rate of 150 fpm and a dose of 150 mj/cm$^2$. The cured samples are adhered to an acrylic adhesive tape (Tape No. 1) or a rubber based adhesive tape (Tape No. 2), and the resulting multi-layered constructions are aged for one day at room temperature (RT) or 158° F. The multi-layered constructions are tested for release performance using the test methods indicated below with the results indicated in Table I.

(1) 90° Release Test Method (90° RTM)—Measure of the force in grams required to remove the paper liner from the adhesive conctruction at a 90° angle and a rate of 12 inches per minute (ipm) or 300 ipm as indicated in Table I.

(2) Imass—Measure of the force in grams used to pull the paper liner from the multi-layered construction at a speed of either 0.05 m/s (meters per second) or 2.54 m/s as indicated in Table I.

(3) Retains—% Retains is the measure of the release force in grams required to remove a holt melt SBR tape from stainless steel that had prior contact to a silicone release layer compared to tape that had no prior exposure to the release layer. The difference is expressed as a percentage of release force of unexposed to exposed. High % retain values are desired. This test is also commonly referred to as a "subsequent adhesion test" in the pressure sensitive adhesive industry.

TABLE I

| Test/Tape | Aging | A | B | C | D |
|---|---|---|---|---|---|
| 90° RTM @ 300 ipm (grams)/ Tape No. 1 | RT 158° F. | 34 g 54 g | 35 g 63 g | 35 g 55 g | 31 g 50 g |
| 90° RTM @ 12 ipm (grams)/Tape No. 2 | RT 158° F. | 25 g 36 g | 26 g 34 g | 23 g 34 g | 31 g 34 g |
| 90° RTM @ 300 ipm (grams)/Tape No. 2 | RT 158° F. | 17 g 29 g | 21 g 22 g | 18 g 22 g | 22 g 23 g |
| Imass @ 0.05 m/s (grams)/ Tape No. 2 | RT 158° F. | 19 g 23 g | 19 g 22 g | 17 g 24 g | 18 g 23 g |
| Imass @ 2.54 m/s (grams)/ Tape No. 2 | RT 158° F. | 35 g 41 g | 40 g 41 g | 39 g 48 g | 37 g 41 g |
| Retains, % | | 93.9% | 96.5% | 90.3% | 94.5% |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A release composition comprising a radiation-curable polyorganosiloxane and cellulose fibers having an average fiber length of about 15 to about 100 microns and an average fiber thickness in the range of about 5 to about 40 microns, wherein said polyorganosiloxane is represented by the formual $$[R_nSiO_{4-n/2}]_m \quad (I)$$

wherein in Formula (I), each R is acryloxy, methacryloxy, a non-substituted monovalent hydrocarbon group containing from 1 to about 20 carbon atoms or a substituted monovalent hydrocarbon group wherein the substituents are selected from the group consisting of chloro-, fluoro-, cyano-, amido-, nitro-, ureido-, isocyanato-, carbalkoxy-, hydroxy-, acryloxy, and methacryloxy; n has an average value of about 1.8 to about 2.2; and m has an average value greater than 2; the polyorganosiloxane containing an average of at least one R group which contains an acryloxy or methacryloxy group.

2. The composition of claim 1 wherein said composition further comprises a photoinitiator.

3. The composition of claim 1 wherein the substituents represented by R in Formula (I) can be aliphatic groups, cycloaliphatic groups, aryl groups, or alkenyl groups.

4. The composition of claim 1 wherein the R groups in Formula (I) have the structure $$CH_2=C(X)C(O)-O-R' \quad (III)$$

wherein in Formula (III), R' is a divalent hydrocarbon group of from 1 to about 15 carbon atoms or an oxyalkylene group containing from 1 to about 4 carbon atoms in the alkylene moiety.

5. A release composition comprising a radiation-curable polyorgansiloxane and cellulose fibers having an average fiber length of about 15 to about 100 microns and an average fiber thickness in the range of about 5 to about 40 microns, wherein said polyorganosiloxane contains acryloxy or methacryloxy groups, and said composition further comprises an acrylated or methacrylated organic polyhydroxy compound or polyamino compound.

6. A release composition comprising a radiation-curable polyorgansiloxane and cellulose fibers having an average fiber length of about 15 to about 100 microns and an average fiber thickness in the range of about 5 to about 40 microns, wherein said composition further comprises a monoacrylate or monomethacrylate compound.

7. A release composition comprising a radiation-curable polyorgansiloxane and cellulose fibers having an average fiber length of about 15 to about 100 microns and an average fiber thickness in the range of about 5 to about 40 microns, wherein said polyorganosiloxane is an epoxypolyorganosiloxane.

8. A release composition comprising a radiation-curable polyorgansiloxane and cellulose fibers having an average fiber length of about 15 to about 100 microns and an average fiber thickness in the range of about 5 to about 40 microns, wherein said polyorganosiloxane is a compound represented by the formula $$GO(R_2SiO)_a(RESiO)_bG \quad (IV)$$

wherein in Formula IV: each R is independently a hydrocarbon group of 1 to about 18 carbon atoms; E is a monovalent epoxy containing hydrocarbon group; G is a silyl group represented by the formula $R_3Si-$ or $R_2ESi-$; a is a number in the range of about 10 to about 300; and b is a number in the range of about 2 to about 10.

9. The composition of claim 8 wherein E contains at least one epoxy group, the remainder of E being comprised of carbon and hydrogen.

10. The composition of claim 9 wherein E also contains an ether or carbonyl oxygen.

11. The composition of claim 8 wherein E is represented by the formula

12. A release composition comprising a radiation-curable polyorgansiloxane and cellulose fibers having an average fiber length of about 15 to about 100 microns and an average fiber thickness in the range of about 5 to about 40 microns, wherein said release composition further comprises an organosiloxane copolymer represented by the formula $$(R_3SiO)_x(SiO_{4/2})_y \quad (V)$$

wherein in Formula (V), each R is independently a hydrocarbon group or a group represented by the formula $$-O(O)C-(R^*)=CH_2$$

wherein R* is hydrogen or a methyl or ethyl group; x is a number from about 0.25 to about 75; and y is a number in the range of about 1 to about 56.

13. The composition of claim 2 wherein said photoinitiator is a benzy ketal, benzoin ether, 2,2-diethoxyacetophenone, 2-bromoacetophenone, 3-bromoacetophenone, 4-bromoacetophenone, ketoxime ether, benzophenone, benzoxanthone or thioxanthone.

14. A release composition comprising a radiation-curable polyorgansiloxane and cellulose fibers having an average fiber length of about 15 to about 100 microns and an average fiber thickness in the range of about 5 to about 40 microns, wherein said cellulose fibers have a specific gravity in the range of about 1.0 to about 1.25.

15. A release composition comprising a radiation-curable polyorgansiloxane and cellulose fibers, wherein said cellulose fibers have an average fiber length of about 18 to about 23 microns and an average fiber thickness of about 15 to about 17 microns.

16. A release composition comprising a radiation-curable polyorgansiloxane and cellulose fibers having an average fiber length of about 15 to about 100 microns and an average fiber thickness in the range of about 5 to about 40 microns, wherein the concentration of said cellulose fibers in said release composition is from about 3 to about 25% by weight.

17. A method of making a release coated substrate which comprises applying a coating of the composition of claim 1 to a substrate; and curing the coating on the substrate by exposing the coating to radiation.

18. The method of claim 17 wherein the composition is cured with ultraviolet light.

19. A release-coated article comprising a substrate which has been coated with the release composition of claim 1 and which has been cured by exposure to radiation.

20. The release-coated article of claim 19 wherein the substrate is paper.

21. A multilayer article, comprising:
(a) a first substrate;
(b) a second substrate;
(c) a release layer comprising the release composition of claim 1 which has been cured by exposure to radiation; and
(d) a pressure-sensitive adhesive layer, wherein the release layer (c) is interposed between the first substrate and the layer of pressure-sensitive adhesive (d) and is preferentially adherent to the first substrate, and the pressure sensitive adhesive layer (d) is interposed between the release layer and the second substrate and is preferentially adherent to the second substrate.

22. The multilayer article of claim 1 wherein the first and second substrates are paper.

* * * * *